United States Patent
Sperl et al.

(10) Patent No.: US 9,527,458 B2
(45) Date of Patent: Dec. 27, 2016

(54) INTERIOR TRIM ELEMENT FOR A VEHICLE DOOR TRIM

(71) Applicant: Lisa Draexlmaier GmbH, Vilsbiburg (DE)

(72) Inventors: Thomas Sperl, Landau an der Isar (DE); Friedrich Graf, Eggenfelden (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 14/975,281

(22) Filed: Dec. 18, 2015

(65) Prior Publication Data

US 2016/0176366 A1 Jun. 23, 2016

(30) Foreign Application Priority Data

Dec. 18, 2014 (DE) .......................... 10 2014 119 057

(51) Int. Cl.
*B60R 13/00* (2006.01)
*B60R 13/02* (2006.01)
*B60N 2/46* (2006.01)

(52) U.S. Cl.
CPC ............ *B60R 13/0243* (2013.01); *B60N 2/46* (2013.01); *B60N 2/466* (2013.01)

(58) Field of Classification Search
CPC ........ B60R 13/0243; B60N 2/46; B60N 2/466

USPC ......................................................... 296/153
See application file for complete search history.

(56) References Cited

U.S. PATENT DOCUMENTS

| 6,893,077 | B1 * | 5/2005 | DeJongh ............ B60N 2/42709 296/1.09 |
| 7,775,584 | B2 * | 8/2010 | Hughes, Jr. ............ B60N 2/466 296/1.09 |
| 2009/0146480 | A1 | 6/2009 | Knowlden |
| 2009/0256384 | A1 | 10/2009 | Hughes, Jr. et al. |

FOREIGN PATENT DOCUMENTS

| DE | 29 43 259 A1 | 5/1981 |
| DE | 10 2008 060 432 A1 | 7/2009 |
| DE | 10 2010 040 021 A1 | 3/2012 |
| GB | 2 064 439 A | 6/1981 |

* cited by examiner

Primary Examiner — Joseph D Pape
(74) Attorney, Agent, or Firm — Finnegan, Henderson, Farabow, Garrett & Dunner LLP

(57) ABSTRACT

An interior trim element for a vehicle door trim may comprise an arm rest and a material pad. The arm rest may comprise a plurality of elongated support elements and a plurality of elongated recesses disposed in regions between the elongated support elements. The arm rest may be configured to couple to an inner side of a door trim beam in a direction perpendicular to the beam. The elongated support elements may be oriented substantially parallel to the beam. The pad may cover the support elements.

20 Claims, 1 Drawing Sheet

INTERIOR TRIM ELEMENT FOR A VEHICLE DOOR TRIM

CROSS REFERENCE TO RELATED APPLICATION

This application is based upon and claims the benefit of prior German Patent Application No. 10 2014 119 057.2, filed on Dec. 18, 2014, the entire contents of which are incorporated herein by reference.

TECHNICAL FIELD

The present disclosure relates to an interior trim element for door interior trims of vehicles, the interior trim comprising an arm rest.

BACKGROUND OF THE DISCLOSURE

On door interior trims, the arm rest may be compressed or pushed together upon impingement by a vehicle occupant during a side impact, to absorb shock energy, reduce force application and lower risk of injury to the occupant. It is therefore desirable to configure the arm rest to be compressible, in a yielding and soft manner, transversely to the longitudinal vehicle axis or perpendicularly to a door beam plane. In addition, a need exists to design the arm rest with high rigidity in the vertical direction to ensure its bracing function for the occupant's arm or elbow. The rigidity of the arm rest in the vertical direction furthermore defines the quality perception of the customer and is therefore valuable.

Because arm rests, door interior trims and the beams thereof are usually produced using an injection molding process, the design options are limited by the demolding direction of the molds. Door interior trims are generally released from the mold transversely to the longitudinal vehicle axis. In the injection molding process, rigid structures may be implemented relatively easily in the demolding direction, while structures transverse to the demolding direction are more difficult to implement. Consequently a problem arises when designing door interior trims that are configured to be soft and yielding in the demolding direction, but rigid and firm transversely to the demolding direction, particularly in the arm rest region.

Current solutions may compromise between high rigidity in the vertical direction and impact requirements, or include additional components or complex molds and increase costs.

German Patent Application No. 10 2010 040 021 A1 discloses a beam of a door interior trim and a separate arm rest beam. Both an overhang of the door beam receiving the arm rest beam and the arm rest beam itself may be configured to yield in the transverse vehicle direction. The rigidity in the vertical direction is created by vertically situated ribs, which may be part of the arm rest beam or door beam. The compressibility may be effectuated by openings in the overhang of the door beam and/or of the arm rest beam. The beams may be at least partially bridged by the ribs to improve the lack of rigidity. The disadvantages include that the loads are distributed among at least two components, the components are complex to produce and the components must be configured for integration into each other.

German Patent Application No. 29 43 259 A1 discloses a door-closing handle and arm rest for the passenger compartment of a motor vehicle. The handle may be made of an elastically yielding material and may be stabilized by an insert comprising a rib structure formed perpendicularly to the beam surface to absorb kinetic energy in the event of a side crash.

SUMMARY

Embodiments of the present disclosure provide an improved interior trim element for a door trim of a vehicle, comprising an arm rest which may be easy and cost-effective to produce. Moreover, the trim element provides high rigidity of the arm rest in the vertical direction, and provides specific compressibility of the arm rest in the direction of the vehicle occupant to meet impact requirements.

According to embodiments of the present disclosure, an interior trim element may comprise an arm rest and a pad comprising a material. The arm rest comprises a plurality of elongated support elements, and a plurality of elongated recesses disposed in regions between the elongated support elements. The arm rest is configured to couple to an inner side of a beam in a direction perpendicular to the beam. The elongated support elements are oriented substantially parallel to the beam. The pad covers the support elements.

Embodiments of the present disclosure may enable securing the arm rest to the beam and the structure thereof substantially independently of the beam. The arm rest may be designed separately so that the arm rest is not an integral part of the beam or of an overhang of the beam.

According to embodiments of the present disclosure, the interior trim part may include the arm rest, soft material pad and the beam. The elongated support elements of the arm rest may be oriented in an X direction and a Z direction parallel to the beam. The support elements may provide ergonomic support for an arm or an elbow resting thereon and may offer sufficient rigidity of the arm rest in the Z direction. The elongated recesses in the arm rest may be provided in the region between the support elements, and may enable the arm rest to be specifically compressed in a Y direction when a lateral impact force is introduced into the arm rest. The X, Y, and Z directions are also referred to as a first, second, and third directions, respectively. The soft material pad covering the arm rest in the Z direction may stabilize the support elements among each other and provide cushioning, so that the support elements may not be felt by a user. The interior trim part may be a separate, single-piece component that may be easy to produce. The interior trim part may provide compressibility of the arm rest in the Y direction, rigidity of the arm rest in the Z direction, and easy mountability on a beam, for example a stepless beam having no overhang.

According to embodiments of the present disclosure, the recesses may be designed as longitudinal slots, which may extend substantially along the first direction (X) and separate the support elements from each other. The longitudinal slots may integrate into the production process of the arm rest by adapting the injection mold. By configuring the longitudinal slots, for example the length, width, number and density in the arm rest, the compression behavior of the arm rest in the event of a side impact may be predetermined. The longitudinal slots may also be interrupted by one or more webs in the longitudinal extension of the slots. The longitudinal slots provided between the base region of the ribs, for example, may have a width in the Y direction of 2.0 mm to 4.0 mm, or 3.0 mm. The length of the longitudinal slots may be oriented in the X direction on the longitudinal extension of the arm rest in the X direction, or may be selected independently. The number of longitudinal slots in the upper region of the arm rest may range from 2 to 12, for example, or may range from 3 to 9.

According to embodiments of the present disclosure, the support elements may be designed as ribs, which in the longitudinal extension thereof may extend along the first direction (X) at least regionally. The ribs may stabilize the arm rest against impression by an elbow from above. The ribs may integrate into the production process of the arm rest by adapting the injection molds. By configuring the ribs, for example the length, height, number, or density in the arm rest, the rigidity of the arm rest may be predetermined. The ribs may have a smallest dimension in the Y direction, a largest dimension in the X direction, and an average dimension in the Z direction. For example, the width of the ribs may be 1.0 mm to 2.0 mm, or 1.5 mm, in the Y direction, and may be 2.0 mm to 15 mm, or 5.0 mm to 10 mm, in the Z direction. The length of the ribs in the X direction may be based on the longitudinal extension of the arm rest in the X direction. The number of ribs in the upper region of the arm rest may range from 3 to 10, for example, or range from 4 to 8.

According to embodiments of the present disclosure, the structure and/or the arrangement of the support elements may extend rectilinearly in the longitudinal dimension (X), or at least partially in a zigzag-shaped or undulated manner. For example, the support elements may be arranged in a rod-like or lamella-like rectilinear manner and parallel to the beam. For larger arm rests, support elements may be provided that are zigzag-shaped or curved in the longitudinal extension. A high supporting effect of the arm rest may be achieved by high ribs situated closely next to each other.

According to embodiments of the present disclosure, the soft material pad may be designed as foamed material, which may be arranged between the support elements at least in the upper, vertical end region. This arrangement stabilizes the support elements in the horizontal orientation (Y direction) with respect to each other and distributes the pressing force among multiple support elements. Moreover, a fitted foam body may make the support elements imperceptible to the user or passenger.

According to embodiments of the present disclosure, the arm rest may be arranged in an oblique position or at an angle with respect to the perpendicular of the plane (X, Z) defined by the inner side of the beam. This may be a slightly sloping angle, starting from the beam, for example of less than or equal to ($\leq$) 80 or $\leq$15°, or $\leq$980 or $\leq$105°, based on the X-Z beam plane.

According to embodiments of the present disclosure, the upper arm rest region of the arm rest and/or the height of the support elements may taper into the vehicle interior (direction (Y)). Such tapering of the arm rest structure may be perceived as pleasant by the user.

According to embodiments of the present disclosure, the recesses in the second direction (Y) may be provided between pairs or groups of support elements not separated by slots. The density of slots in the upper region of the arm rest may vary as a function of the compressibility requirement of the arm rest. For example, structures in which two contiguous ribs are interrupted by a longitudinal slot are contemplated. Numerous further arrangements and structures with respect to the interplay of ribs and slots in the upper region of the arm rest are provided.

According to embodiments of the present disclosure, the recesses may be provided between the base regions of the support elements. The ribs may point upwardly, to the side of the arm rest facing the user's arm or elbow. The recesses or slots of the component in the complementary mold structure may be arranged as protrusions in the base region of the support elements. The injection mold of the arm rest may approximately form the shape of a half shell.

According to embodiments of the present disclosure, the beam of the door interior trim may be stepless at least in the fitting region of the arm rest. The arm rest may be fitted on the inner side of the beam in a cantilever beam-like manner. This may simplify the assembly of the arm rest and give the manufacturer greater design freedom.

According to embodiments of the present disclosure, the arm rest may be designed as a single-piece, off-tool injection-molded part. This may simplify the production and assembly of the arm rest and give the manufacturer greater design freedom.

BRIEF DESCRIPTION OF THE FIGURES

Further details and related advantages of embodiments of the present disclosure will be described hereafter with reference to the figures.

DETAILED DESCRIPTION

Figure 1:
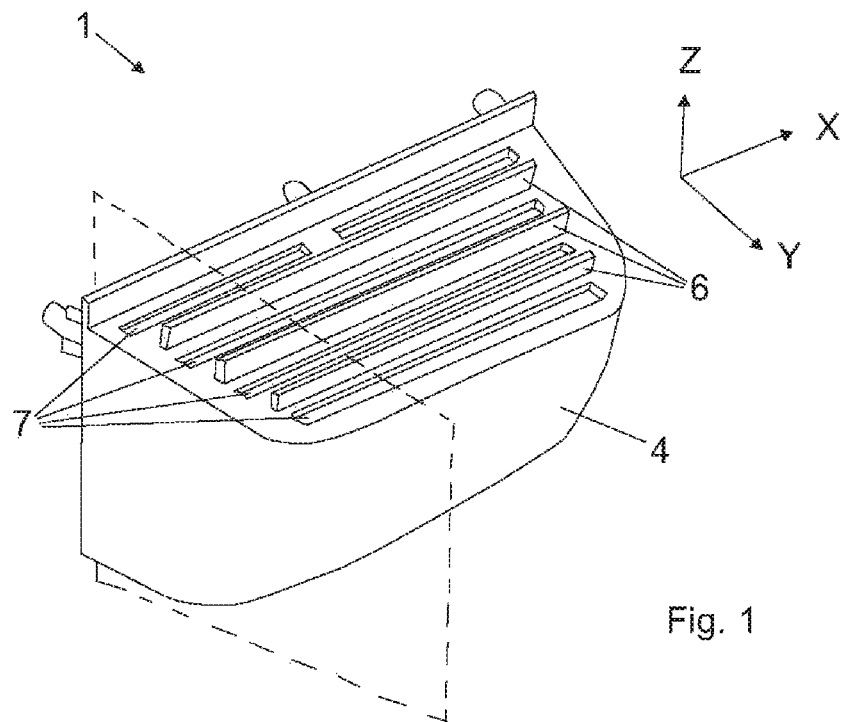
FIG. 1 shows an oblique view of an interior trim element comprising an arm rest according to an embodiment of the present disclosure.

FIG. 1 shows an oblique view of an exemplary interior trim element 1 according to the disclosure, comprising an arm rest 4 and support elements 6 oriented parallel to a beam (beam 2 in FIG. 2, not shown in FIG. 1) or longitudinally in the X direction, and elongated recesses 7 provided between the base regions 9 (shown in FIG. 2) of the support elements 6. The support elements 6 may comprise ribs, and the elongated recesses 7 may comprise longitudinal slots. FIG. 1 shows an embodiment including three ribs and four longitudinal slots designed in one piece, with the upper region of the arm rest 4 and the height in the Z direction extending to the elbow of a vehicle occupant. In the second direction (Y), the longitudinal slots may also be provided between pairs or groups of support elements, whereby the density of longitudinal slots in the upper region of the arm rest 4 may vary as a function of its compressibility requirement. Because the ribs are oriented or extend in the X direction, they may provide no reinforcing action in the Y direction, and consequently may have no negative effects in the event of a side impact.

Figure 2:
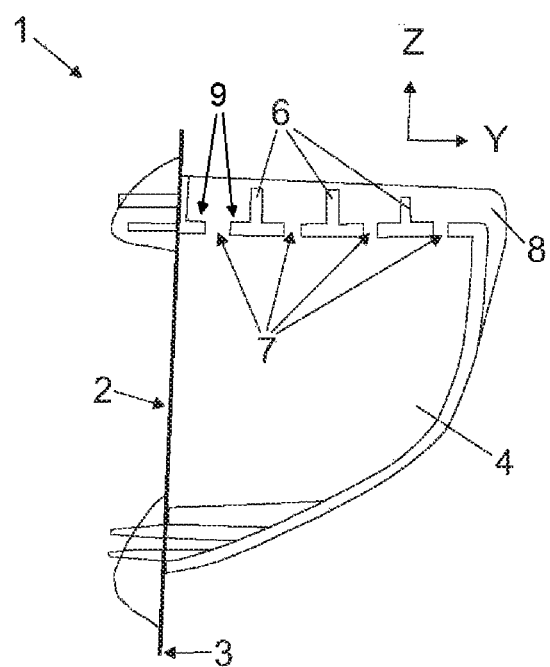
FIG. 2 shows a side view (Y-Z plane) of an exemplary interior trim element comprising an arm rest according to the present disclosure.

FIG. 2 shows a side view of an arm rest 4 along the X direction comprising ribs oriented parallel to the beam 2, and longitudinal slots provided between the ribs. The left region shows the beam 2 of a door interior trim for a vehicle door. The beam 2 has an inner side 3, which is oriented along the X-Z plane. The Z direction defines the vertical vehicle direction, and the X direction defines the longitudinal vehicle direction. The beam 2 may be provided with decorative elements, such as textile, leather or the like, on the inner side 3. The extension direction of the beam inner side 3 is oriented substantially along the X-Z plane.

The upper region of the arm rest 4 may be covered with a pad 8, wherein the pad 8 is arranged at least in the upper, vertical end region between the ribs to provide stabilization. Moreover, the ribs may be imperceptible to the vehicle occupant because of the pad 8. In some embodiments, the pad 8 is made of a foamed material.

As shown in FIG. 2, the cross-section of the arm rest 4 may have the approximate shape of a circular segment such as a half circle or quarter circle. Other shapes are additionally contemplated, including curved, angular and chamfered geometric shapes, for example.

The arm rest 4 may be produced by way of an injection mold as a single-piece, off-tool injection-molded part. The injection-molded part is released from the mold using a slide mold. The slide mold is used to create auxiliary parting planes to expose partial injection-molded part regions, which represent an undercut in the demolding direction. The complex upper region of the arm rest 4, including the ribs and longitudinal slots, may therefore be achieved by using such a slide mold. When the mold is opened, a slide on the slide mold moves out obliquely to the mold axis. This exposes the injection-molded part and allows ejection.

Referring to FIG. 2, the arm rest 4 is joined to the inner side 3 of the beam 2 in a form-locked, force-fit and/or integral manner. The joining and/or fastening elements may be at least partially an integral part of the arm rest 4. When the arm rest 4 is fitted on the beam 2, the arm rest 4 can be arranged in an oblique position or at an angle with respect to the perpendicular of the plane (X, Z) defined by the inner side 3 of the beam 2. This may be a slightly sloping angle, starting from the beam 2, for example of ≤8° or ≤15°, or ≤98° or ≤105°, based on the X-Z beam plane. The arm rest 4 may include an intrinsic chamfer or taper into the vehicle interior (direction Y) having a sloping angle of ≤8° or ≤150, for example.

The present disclosure is not limited to the above embodiments. For example, production methods other than injection molding are contemplated, such as pressing. Additionally, various configurations of ribs and longitudinal slots in the arm rest are contemplated. For example, implementations with more or fewer ribs and longitudinal slots, and/or ribs and longitudinal slots in different configurations. Accordingly, other implementations are within the scope of the present disclosure.

What is claimed is:

1. An interior trim element for a door trim of a vehicle, comprising:
   a beam having an inner side;
   an arm rest coupled to the inner side of the beam in a direction perpendicular to the beam, the arm rest comprising:
      a plurality of elongated support elements oriented substantially parallel to the beam, wherein a height of each of the support elements tapers in a direction towards an interior of the vehicle; and
      a plurality of elongated recesses disposed in regions between the support elements; and
   a pad covering the support elements.

2. The interior trim element according to claim 1, wherein the recesses comprise longitudinal slots extending in a direction substantially parallel to the beam, the longitudinal slots configured to separate at least two support elements.

3. The interior trim element according to claim 1, wherein the recesses are provided between base regions of the support elements.

4. The interior trim element according to claim 1, wherein the support elements comprise ribs, each rib extending in a direction parallel to a longitudinal axis of the vehicle.

5. The interior trim element according to claim 1, wherein the support elements are disposed in an upper region of the arm rest.

6. The interior trim element according to claim 1, wherein the support elements extend rectilinearly in a direction parallel to a longitudinal axis of the vehicle.

7. The interior trim element according to claim 1, wherein the pad comprises a foam material.

8. The interior trim element according to claim 7, wherein the foam material is arranged between the support elements in an upper region of the arm rest.

9. The interior trim element according to claim 1, wherein the arm rest is arranged in an oblique position with respect to a perpendicular of the inner side of the beam.

10. The interior trim element according to claim 1, wherein an upper region of the arm rest tapers in a direction towards an interior of the vehicle.

11. The interior trim element according to claim 1, wherein:
   the beam is stepless at least in a region at which the arm rest couples to the inner side of the beam, and
   the arm rest is coupled to the inner side of the beam in a cantilever beam-like manner.

12. The interior trim element according to claim 1, wherein the arm rest is a single-piece, off-tool injection-molded element.

13. An arm rest for a door trim of a vehicle, comprising:
   a plurality of elongated support elements oriented substantially parallel to a longitudinal axis of the vehicle, wherein a height of each of the support elements tapers in a direction towards an interior of the vehicle; and
   a plurality of elongated recesses disposed in regions between the support elements.

14. The arm rest according to claim 13, wherein the recesses comprise longitudinal slots extending in a direction substantially parallel to the longitudinal axis of the vehicle, the longitudinal slots configured to separate at least two support elements.

15. The arm rest according to claim 13, wherein the recesses are provided between base regions of the support elements.

16. The arm rest according to claim 13, wherein the support elements comprise ribs, each rib extending in a direction parallel to the longitudinal axis of the vehicle.

17. An interior trim element for a door trim of a vehicle, comprising:
   a beam having an inner side;
   an arm rest coupled to the inner side of the beam in a direction perpendicular to the beam, wherein an upper region of the arm rest tapers in a direction towards an interior of the vehicle, the arm rest comprising:
      a plurality of elongated support elements oriented substantially parallel to the beam; and
      a plurality of elongated recesses disposed in regions between the support elements; and
   a pad covering the support elements.

18. The interior trim element according to claim 17, wherein the recesses comprise longitudinal slots extending in a direction substantially parallel to the beam, the longitudinal slots configured to separate at least two support elements.

19. The interior trim element according to claim 17, wherein the recesses are provided between base regions of the support elements.

20. The interior trim element according to claim 17, wherein the support elements extend rectilinearly in a direction parallel to a longitudinal axis of the vehicle.

* * * * *